United States Patent [19]
Timmins et al.

[11] 3,707,770
[45] Jan. 2, 1973

[54] METHOD FOR THE PRODUCTION OF CHEESE SOLIDS

[75] Inventors: Robert S. Timmins, Concord; Bernard S. Horton, Cambridge; Robert L. Goldsmith, Watertown, all of Mass.

[73] Assignee: Abcor, Inc., Cambridge, Mass.

[22] Filed: Aug. 11, 1971

[21] Appl. No.: 170,844

[52] U.S. Cl..................................99/116, 99/452
[51] Int. Cl..............................................A01j 25/11
[58] Field of Search...............31/89, 46; 99/115, 116

[56] References Cited

UNITED STATES PATENTS 2,908,575  10/1959  Spiess, Jr. et al.......................99/116
2,917,827  12/1959  Lankford..................................31/46

OTHER PUBLICATIONS

Horton, B. S. "Prevents Whey Pollution Recovers Profitable By–Products," Food Engineering, July 1970, pp. 81–83.

*Primary Examiner*—Hugh R. Chamblee
*Attorney*—Richard P. Crowley

[57] ABSTRACT

In a process for the preparation of a cheese solid and a treatment of the whey solution by a semipermeable membrane, the improvement which comprises: employing, to wash the curd product of the cheese solid, a low BOD effluent fraction derived from a reverse osmosis high-pressure membrane stage used to treat the whey solution; and recycling the wash effluent to the whey solution to be treated, thereby improving the total management of water in the cheese manufacturing process and avoiding water-pollution problems.

11 Claims, 1 Drawing Figure

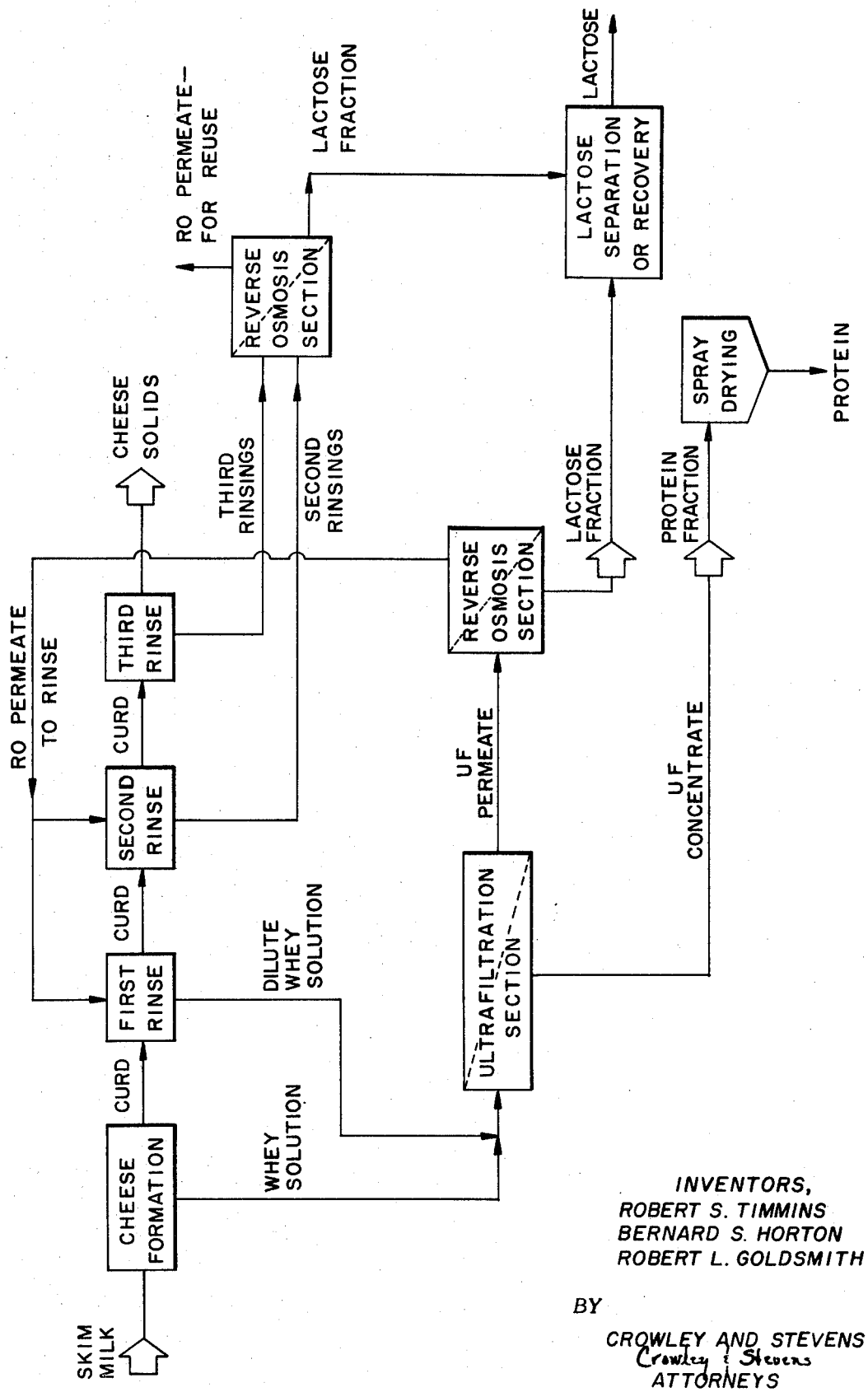

METHOD FOR THE PRODUCTION OF CHEESE SOLIDS

BACKGROUND OF THE INVENTION

Whey solutions derived from the manufacture of cheese solids typically have a high biological oxygen demand, and, therefore, when discharged into waterways, have created pollution problems. A number of techniques have been proposed for handling whey solutions, including the employment of both ultrafiltration and reverse osmosis semipermeable membrane processes. For example, the protein fraction of whey solutions have been recovered and concentrated employing ultrafiltration membranes designed to retain, for example, over 98 percent of the alpha lactalbumin and other high molecular weight soluble milk proteins in the whey solution at low pressures of, typically, 10 to 100 psi. In the ultrafiltration membrane process, there is, typically, no retention of lactose, salts, vitamins and low molecular weight nitrogen compounds, such as urea and free amino acids.

Reverse osmosis processes and techniques have been employed to concentrate lactose or whole whey. Reverse osmosis techniques can be used to concentrate either the permeate from the ultrafiltration stage or whole whey directly. In both cases, lactose is retained and concentrated along with other low molecular weight ingredients. Typical pressures employed in reverse osmosis techniques would range from about 500 to 1,500 psi. The permeate from a reverse osmosis concentration of lactose or whole whey provides for a lactose fraction and a low; for example, under 1,000 ppm, BOD content effluent fraction of the permeate. Often the BOD of the effluent from the reverse osmosis stage is low enough so that the effluent fraction may be discharged directly into the waterways. Typically, the semipermeable membranes employed comprise a cellulose ester, such as cellulose acetate, cast on the inside of a support tube, such as a porous polyolefin, for ultrafiltration techniques, or a resin-hardened, braided glass fiber in reverse osmosis techniques.

In a particularly useful and commercial process, there has been developed a two-step treatment of whey solution combining a first step of ultrafiltration, followed by a second step of reverse osmosis, which two-step process offers a number of significant advantages. Such two-step treatment of whey solutions is described more particularly in an article entitled "Prevents Whey Pollution Recovers Profitable By-Products" by Bernard S. Horton, *Food Engineering*, July 1970, which article is hereby incorporated by reference in its entirety. In the two-step process, a whey solution is converted into a protein fraction, lactose fraction and a water effluent fraction with drastically reduced biological oxygen demand (BOD). The first step uses ultrafiltration to produce a fluid protein concentrate with up to about 20 percent protein and a permeate containing most of the lactose salt and other low molecular weight materials; that is, materials typically having a molecular weight of less than 1,000; for example, 50 to 370. In the second step, the permeate from the ultrafiltration stage is subject to reverse osmosis to yield a concentrated lactose fraction with up to about 20 to 25 percent lactose and a low BOD permeate process effluent fraction which may be discharged from the plant or reused.

Whey is the by-product of two groups of cheese manufacturing processes, one of which produces a sweet whey and the other, which includes cottage, cream, pot and farmers-type cheese, produces an acid whey. In the production of cottage or colby cheese or similar cheeses, the cheese curd is often subject to a number of water rinses to remove lactose and other products in the curd. For example, a cottage cheese curd may be subject to three separate rinse stages. The wash water from such rinses often has an unacceptable BOD demand, and contributes to water-pollution problems.

SUMMARY OF THE INVENTION

Our invention concerns a process which improves the management of water in a total cheese-manufacturing process, and, further, which reduces the difficulties associated with water pollution due to high BOD waste effluent streams from a whey solution. Our process relates to the efficient and economical utilization of effluent water derived from a semipermeable membrane process and the employment of such water to wash or rinse cheese curd and the recycling of such water into the semipermeable membrane process after such use, thereby closing the loop in a pollution cycle where a cheese solid is prepared, and the waste whey solution treated by membrane techniques.

In particular, our invention is directed to the preparation of cottage cheese or colby cheese solids and the treatment of the whey solution derived therefrom in a reverse osmosis or a two-step ultrafiltration and reverse osmosis process, wherein low BOD effluent derived from the reverse osmosis step is employed to wash or rinse the curd product in the first wash stage and the wash effluent then added to the whey solution for recycling.

More particularly, our invention permits a low BOD effluent stream from a reverse osmosis semipermeable membrane step to be employed in a number of wash or rinse stages and with a portion of the wash effluent recycled to the whey solution, and in the later stages, a portion thereof, together with other rinse water, to be subjected to a separate reverse osmosis treatment by the removal of BOD material and to provide a low BOD effluent stream suitable for reuse within the plant.

Our invention and process will be described in detail for the purposes of illustration only in connection with the manufacture of a cottage cheese solid. However, it is recognized that our invention may be utilized in any cheese-manufacturing or similar operation which requires the curd product to employ low BOD water or which incorporates a rinse or wash stage rather than merely a pressing of the curds. In addition, our process will be described in connection with the preferred embodiment of manufacturing a cottage cheese solid in conjunction with the treatment of the whey solution by a two-step ultrafiltration and reverse osmosis process; however, it is recognized that where desired, the whey solution may be treated solely with one or more reverse osmosis stages for the concentration of the protein and lactose fractions, and, accordingly, our process may be employed also in such operation.

DRAWINGS

FIG. 1 is a schematic representation of our process employed in the manufacture of a cottage cheese solid from skim milk with the treatment of the whey solution by a two-step ultrafiltration-reverse osmosis process.

DESCRIPTION OF THE EMBODIMENTS

Skim milk is employed to form a cheese curd in a typical conventional fashion, producing a solid-curd product and a whey solution. The whey solution is directed for concentration of the protein fraction into an ultrafiltration section; for example, in an ultrafiltration section which is composed of cellulose acetate formed in a thin film directly on the inside of a plurality of porous polyolefin support tubes to provide a seamless membrane tube. The membrane is designed to provide over a 98 percent retention of an alpha lactylbumin and other high molecular weight soluble milk proteins. The ultrafiltration is operated at a pressure of 20 to 50 psi at a temperature of about 100° to 140°F. The concentrate of the ultrafiltration section comprises a protein fraction which may then be dried by evaporation, such as by a spray-drying technique to produce a solid protein fraction having unique lactose-free properties. The permeate from the ultrafiltration section is introduced into a reverse osmosis section operated at a pressure typically of greater than 400 psi; for example, 600 to 1,000 psi, at a temperature of about 70° to 100°F. The reverse osmosis section may be comprised of a plurality of high-pressure tubes; that is, cellulose acetate membranes cast directly inside an epoxy-resin-reinforced braided glass fiber tube. The membranes are tailored to provide a retention of the lactose non-protein nitrogen acids having a molecular weight of typically over 50 or 100. The concentrate from the reverse osmosis section comprises a lactose fraction which may be subsequently treated to remove the individual components of the fraction and the lactose present crystallized and rewashed to a high grade for use or the fraction recovered by drying without further separation. The permeate produced in the reverse osmosis section comprises a very low BOD; for example, less than 2,500 ppm BOD, such as less than 1,000 ppm, and very minor amounts of residual organic lactic acid and other products which may have been passed through the reverse osmosis membrane.

After formation of the cheese curd, typically, cottage cheese curd is subject to a series of rinses as washings illustrated as a first rinse, second rise and third rinse stages, although it is recognized that more or less stages may be employed as, for example, in the washing of colby cheese wherein typically only one or at the most two rinse stages are employed. The reverse osmosis low BOD permeate is recycled from the reverse osmosis section to the first rinse stage and employed to rinse the curd. Typically, such a reverse osmosis permeate stream would have a composition of about 3 percent or less solids. The effluent from this first rinse stage is then added to the whey solution being introduced into the first stage ultrafiltration section. The RO permeate is also employed in a second rinse stage; however, due to the very low amount of solids in this stage, rather than adding said wash effluents from the second rinse stage back into the whey solution which may be done, if desired, in the preferred embodiment, the second rinse stage is merely discarded or otherwise treated as will be hereinafter explained. In the third rinse stage, as illustrated, regular wash water may be employed. Where desired, the wash effluents from the second or third or subsequent rinse stages may then be subject to a separate reverse osmosis step or other treatment in order to provide a very low BOD water effluent stream which then may be employed within the plant; for example, as boiler water, additional rinsing, or other plant use, or if desired, discharged without significant water-pollution problems. Our process as described permits a very efficient and economical combination of a reverse osmosis treatment of a whey solution with the preparation of a solid cheese, while minimizing water-pollution problems and maximizing total water management within the cheese-manufacturing plant.

Our process has been illustrated in a single ultrafiltration and reverse osmosis section; however, it is recognized that where desired, the ultrafiltration and reverse osmosis stages may comprise a series of separate and distinct stages employing different membranes, pressures, temperatures or other process conditions, or the same process conditions. Further, our process has been described for the purpose of illustration only employing of a rinse stages; however, the number of rinse stages may vary and be combined with other manufacturing operations, such as pressing steps.

Having thus described in our invention, what we claim is:

1. In a process for the preparation of a cheese solid, which process comprises: the formation of a curd product and a whey solution, the rinsing of the curd product and the treatment of the whey solution by a reverse osmosis semipermeable membrane process to provide a concentrated whole whey or partially demineralized whole whey product and a low BOD effluent fraction of permeate, the improvement which comprises:
   employing the low BOD effluent fraction from the reverse osmosis process to wash the curd product, and, thereafter, to add at least a portion of the wash effluent from such rinse stage to the whey solution prior to introduction into the reverse osmosis process.

2. The process of claim 1 wherein the cheese solid is a cottage or colby cheese.

3. The process of claim 1 which includes washing the cheese curd a plurality of times in successive wash stages.

4. The process of claim 1 which includes employing the low BOD waste effluent fraction in a first and a successive second wash stage.

5. The process of claim 3 which includes adding the low BOD effluent fraction from the first wash stage to the whey solution to be separated.

6. The process of claim 3 which includes employing the washings from the second and subsequent wash stages as a feed stream to a reverse osmosis stage to provide a low BOD effluent fraction.

7. The process of claim 1 wherein the low BOD effluent fraction has a BOD content of 2,500 ppm or less.

8. In a process for preparing a cheese solid, which process comprises: forming from a milk product a cheese curd and an aqueous whey solution, the whey solution containing a protein fraction and a lactose fraction; washing the cheese curd so formed with water; separating the protein fraction from the lactose fraction by employing a low-pressure ultrafiltration semipermeable membrane; separating the lactose permeate fraction so obtained by a high-pressure reverse osmosis semipermeable stage into a lactose fraction and low BOD effluent fraction; and recovering the cheese solid after washing, the improvement which comprises;
  a. washing the cheese curd with the low BOD effluent fraction from the reverse osmosis stage; and
  b. adding the effluent fraction after washing to the whey solution prior to subjecting the whey solution to the ultrafiltration and reverse osmosis semipermeable stages.

9. The process of claim 8 which includes washing the cheese curd a plurality of times in successive wash stages, and employing the low BOD effluent fraction in the first and second wash stages.

10. The process of claim 9 which includes adding only the wash effluent from the first stage to the whey solution to be separated.

11. In the process of preparing a cottage cheese solid, which process comprises: forming from a milk stream a cheese curd product and a whey solution; washing the curd product with water in a series of at least two successive wash stages; separating a whey solution containing a protein fraction or a lactose fraction into a protein fraction by subjecting the whey solution to a low-pressure ultrafiltration semipermeable membrane stage to provide a protein fraction and a lactose fraction; separating the lactose fraction into a concentrated lactose fraction and a low BOD effluent fraction by employing a reverse osmosis high-pressure semipermeable membrane stage, and recovering the cottage cheese solids, the improvement which comprises:
  a. washing the cheese curd product in at least the first and second wash stages with the low BOD aqueous effluent fraction derived from the reverse osmosis stage; and
  b. adding the wash effluent from the first wash stage to the whey solution prior to separating the whey solution in the ultrafiltration and reverse osmosis stages.

* * * * *